United States Patent [19]

Oechsle et al.

[11] Patent Number: 5,484,620
[45] Date of Patent: Jan. 16, 1996

[54] METHOD OF MANUFACTURING STABILIZING AND/OR FILTERING AIDS FOR USE IN THE PROCESSING OF LIQUIDS, ESPECIALLY BEVERAGES

[75] Inventors: Dietmar Oechsle, Schwäbisch Gmünd; Wolfgang Baur, Waldstetten; Ludger Gottkehaskamp, Göggingen, all of Germany

[73] Assignee: Schenk-Filterbau Gesellschaft mit beschränkter Haftung, Waldstetten, Germany

[21] Appl. No.: 323,529

[22] Filed: Oct. 14, 1994

Related U.S. Application Data

[63] Continuation of Ser. No. 956,890, filed as a PCT/EP91/01815, Sept. 23, 1991, abandoned.

[30] Foreign Application Priority Data

Dec. 22, 1990 [DE] Germany ............... 40 41 478.7
Aug. 2, 1991 [DE] Germany ............... 41 25 594.1

[51] Int. Cl.$^6$ ............... B29B 9/08; C12H 1/044; C12H 1/052
[52] U.S. Cl. ............... 426/422; 210/670; 210/691; 264/85; 264/117; 264/118; 264/122; 264/125; 264/126; 427/213; 427/221; 427/222; 426/423
[58] Field of Search ............... 426/271, 422, 426/423; 210/670, 691; 264/85, 117, 118, 122, 125, 126; 427/213, 221, 222

[56] References Cited

U.S. PATENT DOCUMENTS

| | | |
|---|---|---|
| 3,172,935 | 3/1965 | Hoffman . |
| 4,166,141 | 8/1979 | Westermann et al. ............ 426/422 |
| 4,820,420 | 4/1989 | Hums et al. ............ 210/670 X |
| 4,871,498 | 10/1989 | Nakamura et al. ............ 264/117 X |

FOREIGN PATENT DOCUMENTS

| | | |
|---|---|---|
| 0159696 | 10/1985 | European Pat. Off. . |
| 2298965 | 8/1976 | France . |
| 2520752 | 8/1983 | France . |
| 1907610 | 2/1969 | Germany . |
| 2648978 | 10/1976 | Germany . |
| 3015439 | 4/1980 | Germany . |
| 3626378 | 8/1986 | Germany . |
| 620133 | 2/1977 | Switzerland . |

OTHER PUBLICATIONS

PCT/DE 86/00117 of 19 Mar. 1986, "Process ... Especially Beer", Hums, Norbert et al.; Haft Berngruber Czybulka.

*Primary Examiner*—Leo B. Tentoni
*Attorney, Agent, or Firm*—Robert W. Becker & Associates

[57] ABSTRACT

With the method of processing liquids, fine to very fine organic and/or inorganic granular particles are used, whereby pursuant to the invention the particles are mixed and compressed together in a first step to form an agglomerate that is heated at least to a temperature that is near the melting point thereof. The particles are thereby fixed in place by being subjected to a process similar to sintering for a suitable length of time, whereupon the resulting agglomerate is screened, or reduced in size in a grinder, to a granular size that is suitable for an intended use. This enables stabilizing and filtering aids to be produced with predetermined or predictable physical or chemical properties that are suitable for specific processes.

27 Claims, 2 Drawing Sheets

5,484,620

METHOD OF MANUFACTURING STABILIZING AND/OR FILTERING AIDS FOR USE IN THE PROCESSING OF LIQUIDS, ESPECIALLY BEVERAGES

This application is a continuation of application Ser. No. 07/956,890 filed as a PCT/EP91/01815, Sept. 23, 1991, now abandoned.

BACKGROUND OF THE INVENTION

The present invention relates to a method of manufacturing stabilizing and/or filtering aids, for use in the processing of liquids, especially beverages, using fine to very fine organic and/or inorganic granular particles.

During the filtration of liquids, especially beverages, to separate off undesired solid particles, raw materials of natural origin, such as diatomites, perlites, cellulose, are largely used because up to now it has not been possible in practice to produce other stabilizing and/or filtering aids, such as synthetic ones, that in comparison to the raw materials of natural origin have at least nearly the same flow, filtration, or satisfactory recycling characteristics. The known filtration processes therefore have the drawback that the aforementioned filtering aids cannot be regenerated, are produced in large quantities, and hence form a considerable source of environmental pollution since they must be stored in dumps.

It is known, after the preclarification of liquids, such as beer, to carry out a stabilization by adding stabilization means that adsorb polyphenols, such as polyvinylpolypyrrolidone (PVPP), possibly in combination with stabilizing means that adsorb albumen (PCT WO 86/05511).

Also known from DE 36 26 378 A1 is a method for the cake filtration of beverages, especially beer, where a chemically regeneratable filter material, namely pulverous aluminum oxide ($Al_2O_3$), and in particular predominantly the $\alpha$-$Al_2O_3$ powder, is used as raw material for sheet filters or filter sheets. Since these materials also have very different densities, filter cakes having at least nearly homogeneous characteristics can scarcely or at best inadequately be built up. A further drawback of the known mixtures of heavy and light materials is that when dynamic influences are encountered during the filtering process, for example due to unforeseeable pressure impacts, or during transport, these mixtures easily become separated or disassociated. With the known cake filtration that is conventional these days, one is furthermore limited in selection of the filtering aid by the respective material that is to be filtered, and it is scarcely possible in practice, due to the problems of mixing the filtering aids, to achieve the desired and necessary uniformity of the caking and hence defined filter cakes with regard to cake height, permeability, etc.

It is an object of the present invention to provide methods of processing liquids, especially beverages, with which, by means of fine to very fine organic and/or inorganic granular particles, stabilizing and filtering aids having predetermined or predictable physical or chemical properties suitable for specific purposes can be produced, so that it is possible, with structurally straightforward apparatus, to carry out qualitatively high value stabilization and filtrations, even in so-called recycling processes.

SUMMARY OF THE INVENTION

This object is realized by a method that includes the steps of: mixing and compressing the particles together to form an agglomerate; heating the agglomerate at least to a temperature that is near to the melting point thereof to thereby fix the particles in place by subjecting same to a process similar to sintering for a suitable length of time; and providing a particle size that is suitable for an intended use by subjecting the agglomerate to one of a screening process or a grinding process.

The inventive method can be advantageously carried out for the production of beverage-stabilizing aids of predetermined granular size and stability via organic granular particles of synthetic origin. Suitable for this purpose are, for example, PVPP (polyrinylpolypyrrolidone) and/or granulated plastic material, such as PE (polyethylene) granules, and/or modified cellulose. In this connection, the synthetic organic particles can have different granule fractions, and in particular preferably between 0.1 µm to about 10 µm and/or between 10 µm to about 50 µm and/or greater than 50 µm, whereby in certain cases these different granule fractions can also be mixed.

The agglomerations of such organic particles of synthetic origin for producing stabilizing agents of a particular granular size and stability can be carried out pursuant to the present invention in that the particles are subjected to a compacting process (see Ullmann, volume 2, pages 313 to 343) such that, for example in a screw press that is disposed upstream of a compacting apparatus, the particles are precompressed and heated for a specific duration, for example 10 to 120 minutes, at temperatures in the vicinity of the melting point, for example 140° to 260° C. Subsequently, the particles are sintered together to form the agglomerate in the compacting rollers at a specific sintering temperature, which can, for example, be between 160° and 170° C., for a suitable length of time of preferably 0.1 to 5 minutes. The thus resulting agglomerate is subsequently converted into a desired particle fraction by grinding and/or screening units. In this way filter materials, especially for the agglomeration of liquids such as beer or the like, can be produced that throughout have predetermined, i.e. homogenous, characteristics, for example with respect to its dimensions or its compactness, and do not dissociate in comparison to known stabilizing aids. Since by means of the inventive method the aforementioned organic particles, such as PVPP, can be agglomerated to form larger particles, the method also offers the possibility of processing organic particles that are in very fine form, for example as dust, and that are very inexpensive to purchase, to form qualitatively high value stabilizing aids of predetermined characteristics, such as granular size, stability, etc. For example, fine granular PVPP having a granular size of 0.1 µm to 50 µm can be converted into a fraction having a granular size of 60 µm to 120 µm by heating and simultaneously precompressing the fine PVPP in the screw press at a temperature of 165° C. for 60 minutes. The material is thereafter sintered together within a short time of about one minute between the compacting rollers at a sintering temperature of about 175° C. and a pressure exerted by the rollers of about 1000 $N/cm^2$. The resulting product can be further processed in a subsequently provided classifying or sorting apparatus, for example a cyclone or air separator, by separating the agglomerated particles within the desired granular size spectrum. The fine grains resulting during the size reduction in the sorting apparatus can again be supplied for compacting and agglomeration, while the granules that are too coarse can be reduced in size until the desired granule size distribution, in the aforementioned example up to a granule fraction of 60 to 120 µm, is achieved.

The inventive method can also be expanded for producing agglomerated filtering aids that have multiple uses and that have defined physical and/or chemical properties, i.e. are adapted to a respective particular application. For this purpose, pursuant to the present invention, in a first method step fine-grained organic particles of synthetic origin, for example fine-grained PVPP, are mixed and homogenized in a mixing or homogenization apparatus with organic fibers of synthetic origin, for example polypropylene (PP) and/or polyethylene (PE) synthesis pulp or high density polyethylene (HDPE), high density polypropylene (HDPP), halogenated polyethylenes, polyoxymethylene or polyamides, in such a way that very fine particles of the granular particles, i.e. of the granulate, rest adhesively against the moist surfaces of the fibers. Thereafter, the mixture is fixed at temperatures in the vicinity of the melting point of the lower melting components, i.e. the components that melt first; subsequently, the wetting water is evaporated, and the fine particles are sintered together. The sintered together agglomerated material is subsequently again reduced in size in a size-reducing apparatus, for example a pinned disk mill, and again is separated within the desired granular size spectrum via a subsequently disposed sorting apparatus (cyclone, air screen or the like). Instead of a mixture of the aforementioned organic particles of synthetic origin, it is also possible to use particles of natural origin, such as cellulose and/or starch particles, as fine-Grained mixture components. Also suitable are inorganic granular particles, such as diatomites, perlites, highly calcined, alkali and acid resistant oxides, such as α-aluminum oxide, zirconium dioxide, titanium dioxide and/or zeolites or similar materials. It is also conceivable to utilize mixtures of the aforementioned particles to achieve particular compositions or characteristics.

In a similar manner, the fibrous components of synthetic origin of the described method can also be replaced by natural fibers. Suitable for this purpose are, for example, nearly alkali and acid resistant α-cellulose fibers that have been bleached with chlorine or hydrogen peroxide and have been wet and/or dry conditioned. These fibers, as well as the organic fibers of synthetic origin, advantageously in general have a fiber length of from only a few micrometers to 5000 μm and a fiber thickness of from about 0.1 to 50 μm. Instead of the organic fibers of synthetic or natural origin, inorganic fibers can also be used, either by themselves or in a mixture with these other fibers. Suitable for this purpose are, for example, glass fibers, carbon fibers, aluminum oxide fibers, or metal fibers. These fibers should also have a fiber length of from only a few micrometers to 5000 μm and a fiber thickness of from about 0.1 to 50 μm. It is also possible to use finely ground high-grade steel in the form of dust or particles, for example with a thickness of 0.1 to 0.5 μm. Particularly suitable are, for example hydrophilic thermoplastic fibrils having a water content of from 0 to 60%, preferably between 30 to 50%. In this connection, it is advisable to use fine-fibrous thermoplastic fibrils having a nearly parallel, in other words open, fiber orientation.

The heating of the mixture of fine-grained material and moist hydrophilic thermoplastic fibrils is advantageously carried out slowly as the temperatures increase so that the water fraction is completely evaporated. The thermoplastic fibrils themselves can have a fiber length of 0.05 to 5 mm, preferably between 1 to 1.5 mm. It has been proven to be advantageous if during the heating process the mixture is kept in movement, for example by stirring or by a fluidized bed, whereby the heating phase can also take place in an inert atmosphere, for example in a nitrogen atmosphere.

With the aid of the temperature control, which depending upon the melting point of the thermoplastic components can be from 100° to 270° C., and depending upon the duration of the thermal treatment taking into consideration the static or dynamic conditions (stirring, fluidized bed etc.), there is ensured during the heating that the effective surfaces of the agglomerated particles are maintained or that very porous, filtration-active structures are formed. The aforementioned fine-grained, inorganic granulate components and pulverous α-aluminum oxide (α-$Al_2O_3$) are particularly suitable for the cake filtration of beverages. As fine-grained granulate components it is also possible to use finely and dry ground cellulose having a thickness between 0.1 to 0.5 mm and a range of grain sizes from 0.1 to 100 μm, preferably between 1 to 80 μm. The heating phase is carried out in an inert atmosphere if oxidation, and hence an undesired change in color, is to be avoided during the sintering process. In this connection, the inert gas (nitrogen, helium or the like) can be recovered in the closed circuit.

By appropriately setting the mixing conditions of the materials that are to be agglomerated and/or by appropriately controlling the temperature during the heating phase, the porosity and active surface of the material that is to be agglomerated can be established for the intended application, whereby the surface, for example when PVPP is used, maintains its adsorption characteristics. Very good results can be achieved in this way for stabilization of beverages or other liquids.

The advantages of the method described above, where a fine-grained component and a fibrous component of the aforementioned types of material are sintered together to form agglomerates, can also be obtained via a similar mode of operation that is similarly suitable for manufacturing filtering and stabilizing aids for liquids, especially beverages. The aforementioned fine-grained organic particles of synthetic origin (e.g. fine-grained polymerized PVPP, PE granulates, modified cellulose, or the like) are first intensely mixed with the aforementioned organic fibers of synthetic origin (for example synthetic fibers of PE, PP, HDPP, HDPE, etc.) and are then supplied to a compacting machine, whereby the operating temperature, for a specific length of time, is maintained in the vicinity of the low melting components, and thereafter the resulting agglomerate, by means of crushing and mixing apparatus, is converted to desired grain size fractions. Here also it is possible to use particles that preferably have different grain fractions of 1 μm to about 10 μm or between 10 μm to about 50 μm or greater than 50 μm. In order to obtain, for example, agglomerates of fine-grained PVPP and PE fibers of a size of 30 to 200 μm, preferably between 60 to 120 μm, the two components are mixed and homogenized, and are thereafter heated and precompressed in a screw press for about 60 minutes at a temperature of about 125° C. Also with this example it is expedient to maintain a temperature of about 135° C. and a pressing roller pressure of about 1000 $N/cm^2$ between the compacting rollers such that the components are sintered together within the short time of about one half minute. Thereafter, the sintered material is again reduced in size and sorted. This method takes advantage of the bonding mode between the selected materials, PVPP and a PP and/or a PE synthesis pulp.

Pursuant to a further specific embodiment of the inventive method, stabilizing and/or filtering aids for use in the processing of liquids, especially beverages, using fine organic and/or inorganic granular particles, can be produced, especially for alluvial and/or cake filtration, by spraying binder in a drying tower or a fluidized bed onto granular organic particles of natural or synthetic origin—i.e. for example cellulose, PE, PVPP particles etc.—or inorganic particles, for example diatomires, perlites, highly calcined oxides (e.g. $\alpha$-$Al_2O_3$, zirconium dioxide), carbon particles, etc., or mixtures thereof, or also fibers of natural origin, such as cellulose fibers and/or organic fibers of synthetic origin (PE, PP, HDPE, HDPP, polyamides, etc.), as already described, similarly however also inorganic fibers of glass ($Al_2O_3$) or metal, for example high-grade steel, having a size ranging from only a few micrometers to about 5000 μm and a thickness of 0.5 μm to 50 μm. The binder can be melamine formaldehyde resins or epichlorohydrin or epoxy resins and/or suitable thermoplastics. In this connection, during the agglomeration process, the sprayed-on binder (coating material) is sprayed into the drying tower or into the fluidized bed, and is condensed out onto the particles at a specific temperature. The resulting coated particles are subsequently subjected to a factioning via a grinding and screening process. The coated agglomerated particles are then reduced in size to the intended grain size, for example by grinding or crushing, and are thus provided with the desired fractions. The filtering aid manufactured in this manner is, in addition to being suitable for alluvial filtration, particularly suitable for cake filtration where the loose filtering aid is caked in the filtration unit prior to the filtering process. This method of operation is not provided for a layer filtration, where prefabricated filter cakes are used.

The filtering and stabilizing aids manufactured according to the inventive methods can, pursuant to the present invention, be used as deposition medium not only for the filtration of beverages but also for the alluvial or cake filtration of pharmaceutical as well as chemical liquids. In this connection, the regeneratable filtering aids, after a filtration cycle, can be regenerated and again be used as filtering aid during the cake filtration. The cake filtration is utilized, for example, for the separation of particulate matter and colloidal particles (yeasts and turbid material) for beverages such as juice, beer and wine in horizontal filters, plate-type filters, frame filters and cartridge filters. In so doing, in a known manner a particular quantity of the homogeneous inventively manufactured filtering aid that has defined characteristics is first suspended in the unfiltered material or in water (for example 100 to 3000 $g/m^2$) and is then preliminarily deposited in a known manner on a support, e.g. filter plates. Thereafter, a specific quantity, for example 50 to 500 g/hl of this filter medium suspension is continuously added to the stream of unfiltered material until the filling or slurry space of the filter is used up or the permissible tank pressure is reached. After conclusion of the filtration, the filter is pressed empty, the filter cake formed in the filter is regenerated and is recycled into a so-called receiving or dosing vessel. There, the filter cake is resuspended in water and can again be used for the cake filtration. Pursuant to the present invention, it is also possible to regenerate the filter cake directly in the receiving vessel, whereby the regenerated and resuspended particles must be deposited in the filter to allow rinsing free of regenerating medium. The particles are then returned to the dosing vessel and are subsequently used for a further cake filtration.

The significant advantage of the use of the inventive filtering and stabilizing aid for cake filtration is that every possible setting as a function of the unfiltered material and the methodology that is to be used is possible in that the inventive filtering aid can be synthesized, i.e. built up, right from the start in such a way that it can be directed to the requirements of the respective unfiltered material. Whereas during deposition with diatomite, i.e. during the diatomite filtration, depositions having a height of from 25 to at the most 40 mm were possible, with the inventive aid it is possible to have depositions of up to a 60 mm thickness. Increasing the alluvial filter cake at the same time leads to improvement of the filter apparatus, which can have a simpler construction and can be smaller, whereby at the same time the previous problems of mixing and nonuniform deposition encountered with conventional filtering aids are eliminated with the inventive stabilizing and filtering aids; these can now be coordinated with the requirements of the unfiltered material in that very defined filter cakes having a predetermined permeability, cake height etc. can be manufactured.

It has been shown that the filtering aid produced pursuant to the inventive method can be advantageously used not only for the cake and/or deep bed filtration in the beverage industry, but also in the pharmaceutical and chemical industries. In the processing of beverages, the filter aids are particularly suitable for the separation of particulate matter and/or colloidal particles.

Pursuant to the present invention, for the cake and/or deep bed filtration it is possible to use filtering aid manufactured pursuant to the invention that is preferably regeneratable. The regeneration is effected after a filtration cycle; the filtering aids can, after each regeneration, again be used for the cake and/or deep bed filtration. For example, this can be effected following the previously described cake filtration in order to separate off colloidal particles and/or particulate matter. In so doing, the procedure, in a manner known per se, is that the inventive filtering aid that is suspended in the unfiltered material or in the water is deposited upon filter elements to a desired filter cake thickness, for example of from about 20 to 50 or 60 mm. Depending upon the liquid that is to be filtered, the filter cake is sterilized and/or dehydrated and hence compressed. Filtration can then be undertaken to a pressure differential of about 4 bar. After conclusion of the filtration, the filter is pressed empty, the filter cake is regenerated in the filter, and a further cake and/or deep bed filtration can follow.

After 3 to 6 filtration and regeneration cycles, the filter cake is returned to a dosing or receiving vessel, where it is resuspended and can then be used reused for a cake and/or deep bed filtration. Here also as an alternative, the filter cake can be regenerated in the receiving vessel, whereby the regenerated and resuspended particles must be deposited in the filter for the rinsing free of regenerating medium.

As previously described, the drawback of the heretofore known caking or filtering aid, for example in particular diatomire, perlite, cellulose, is that it was not possible for these filter particles to start in a thoroughly homogeneous manner and to have a particle size that is adapted to the respective unfiltered material, so that a conglomerate of randomly mixed and formed filter particles was made available for filtration. The inventive methodology now makes it possible, so to speak, to manufacture precisely preconstructed filter particles that not only permit greater deposition upon filter elements in conventional filter vessels, but also allow new application techniques during the stabilization of beverages, such as beer, juice, wine or the like. With one such application, pursuant to the present invention the stabilizing and/or filtering aids, for example PVPP particles, are deposited in a filter column while being dosed in the stream of unfiltered material, and the deposited filter cake is regenerated in column form and is subsequently withdrawn in a dosing apparatus, for example a dosing vessel. Thereafter, the deposited material can be used for resuspension in such a way that the PVPP particles are again deposited in a column. This can advantageously occur in such a way that at least two filter columns are operated continuously in that filtration or stabilization takes place in one column and at the same time regeneration takes place in the other column.

DESCRIPTION OF PREFERRED EMBODIMENTS

Figure 1:
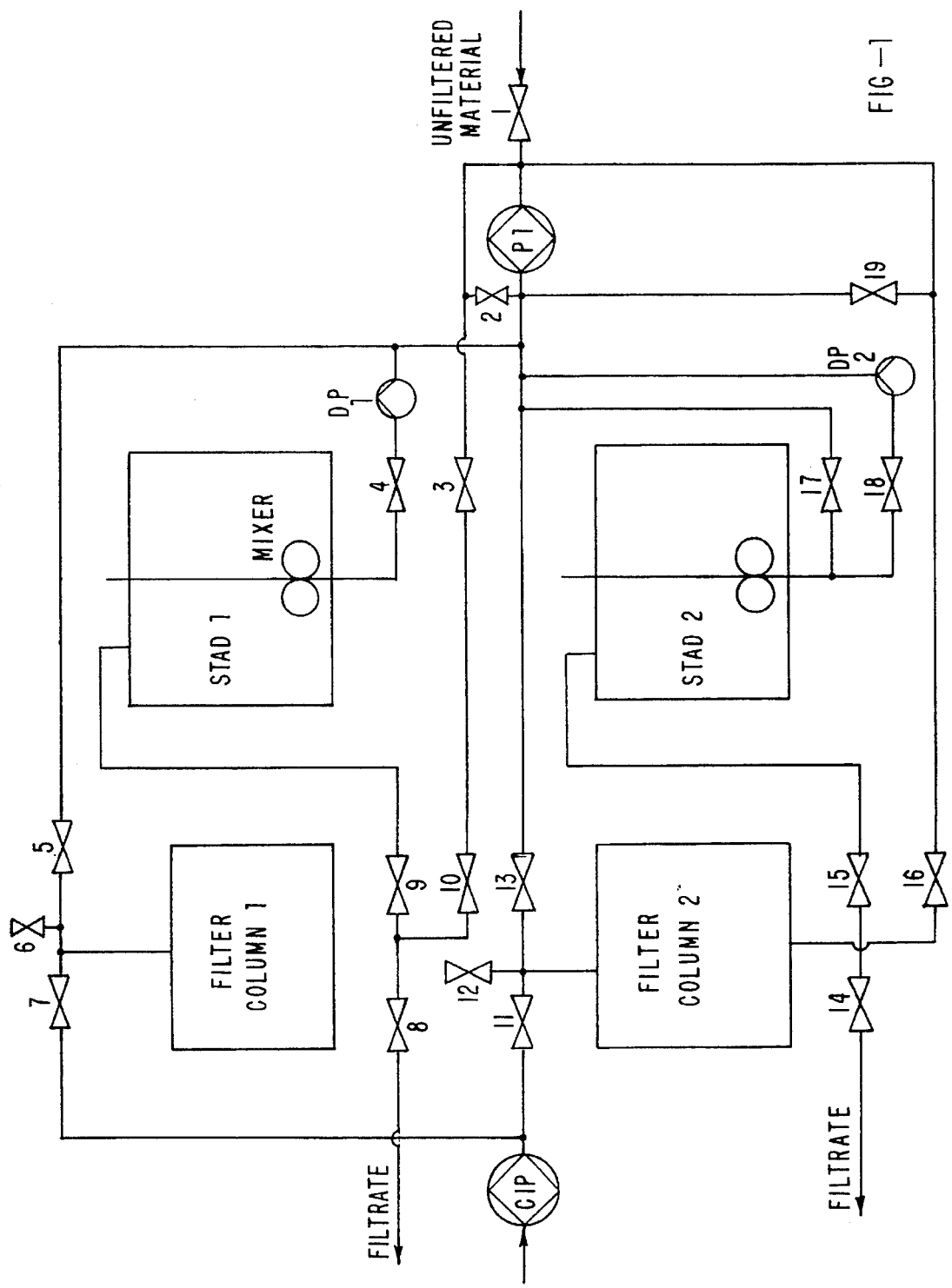
FIG. 1 diagrammatically illustrates the PVPP stabilization in a filter columns.

Prior to start of stabilization, the tanks STAD 1 and STAD 2, to prepare the approximately 10 weight percent PVPP-suspensions, are filled with water and PVPP, which is prepared pursuant to one of the aforementioned agglomeration processes. The water is pumped into the tanks by the feed pump P1 via the valves 1, 3, 18; during the first start, the PVPP is manually supplied through manholes in the tank covers. The mixers in the STAD 1 and STAD 2 keep the suspension homogeneous.

After sterilization of the unit, the filter column 1 is pressurized with carbon dioxide via the valve 6, and is filled with unfiltered material via the valves 1, 2, 10. During the filling process, the valve 6 is open for venting purposes.

During the preliminary deposition, PVPP-suspension is dosed via the pump DP1 into the circuit that is opened by switching of the valves 5, 10, 4.

After this, a shift is made to stabilization, whereby via DP1, PVPP-suspension is dosed into the stream of unfiltered material that is fed by P1 by switching of the valves 1, 4, 5, 8.

For a continuous operation of the unit, after the filter column 1 has been used up, the stream of unfiltered material is diverted to the filter column 2 for stabilization, whereby this filter column 2 is prepared for stabilization pursuant to the aforementioned regeneration. Regeneration of the filter column 1 is carried out simultaneously with stabilization in the filter column 2.

The beverage that is to be stabilized is pushed with inert gas via the valve 6 through the filter column and via valve 8 into a non-illustrated storage tank. By means of the CIP-pump (CIP= cleaning in place, i.e. automatic cleaning in the installed state) and the activated valves 7 and 8, the filter column 1 is now filled with hot water (T>80° C.). This water is displaced into the waste water channel by hot approximately 1% soda lye (T>80° C.); this is followed by hot and cold water rinses as well as an acid rinse. By means of an inert gas, the PVPP is conveyed back via the discharge valve 9 into the tank (STAD 1). A preliminary deposition in the manner previously described follows.

When the filter column 2 is used up, the stream of unfiltered material is diverted to the filter column 1 for stabilization, and a stabilization of the filter column 2 is simultaneously carried out to regenerate the same.

With this mode of operation, filter columns having a height of up to 1.5 m and a diameter of up to 1.5 m can be precoated. Such filter cakes, for example of PVPP, can be regenerated and can thereafter be removed to dosing vessels where they can be resuspended and after regeneration can again be deposited in a column. As shown in FIG. 1, this method can be used particularly economically if at least two columns are continuously operated, whereby one column undertakes filtration while the other is simultaneously being regenerated.

Figure 2:
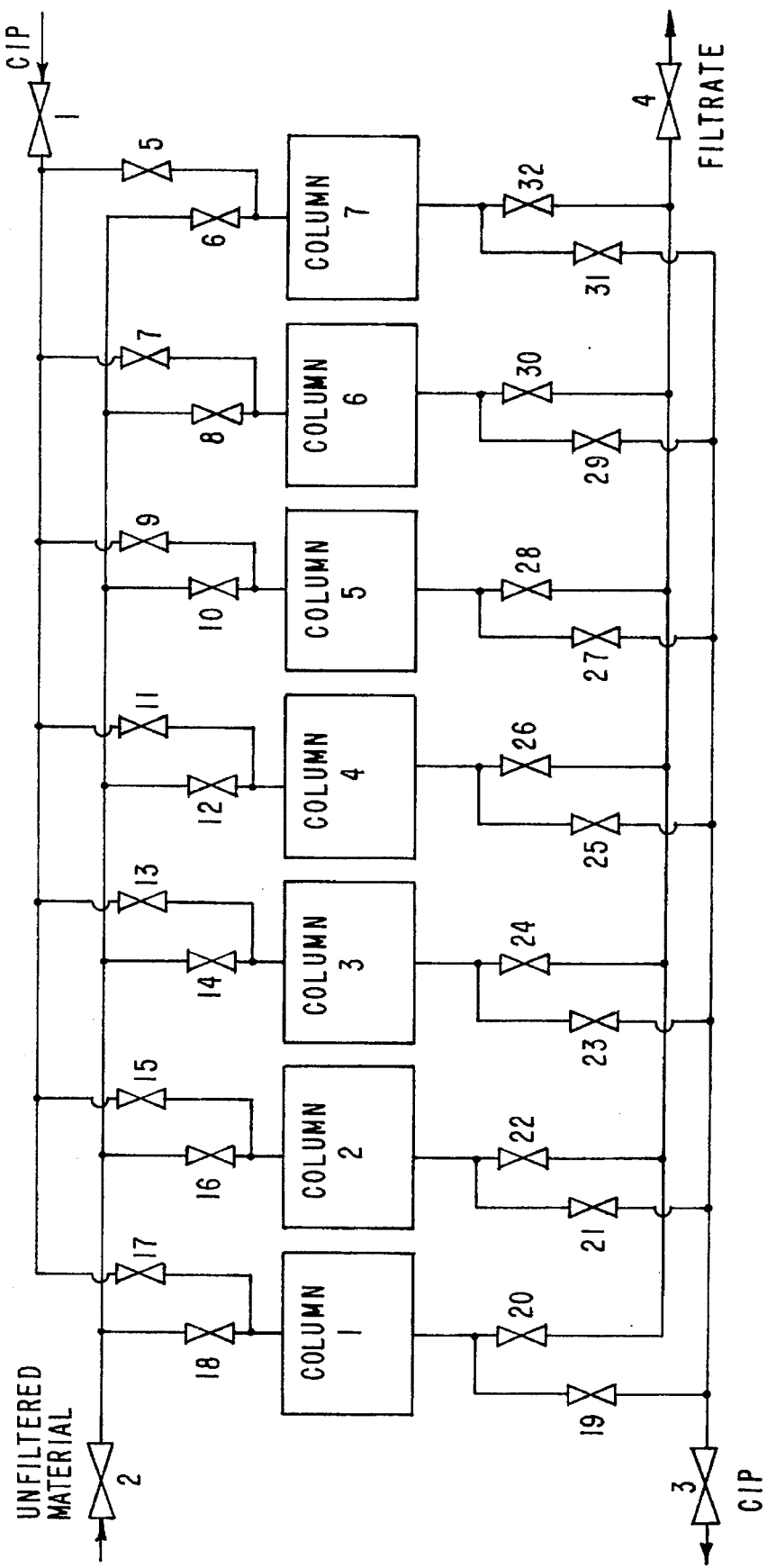
FIG. 2 schematically illustrates the PVPP stabilization in the static column process.

A further inventive procedural technique for stabilizing beverages, especially beer, juice, wine, utilizing stabilizing and/or filtering aids, that in particular are produced pursuant to the described inventive method, can be inventively achieved utilizing cake filters in that the stabilizing and/or filtering aids are disposed in more than three filter columns, and in particular in up to 100 filter columns, in such a way that a certain quantity of the unfiltered material is conveyed through one of the columns until this column has used up up to about 80% of its adsorption capacity. Thereafter, the stream of unfiltered material is conveyed into another reclaiming column until again about up to approximately 80% of the adsorption capacity thereof has been used up, whereby in this manner gradually all of the not yet used up, i.e. regenerated, columns that are present are continuously connected into the circuit, while simultaneously the already used-up columns are similarly continuously regenerated one after the other. A schematic illustration of the PVPP stabilization in the static column process is shown in FIG. 2.

A specific quantity of PVPP that is adapted to the volume of the columns is respectively disposed in the columns 1 to 7 as a suspension or in dry form as produced pursuant to one of the previously mentioned agglomeration processes.

During the continuous operation, a number of columns are connected for stabilization and a number of columns undergo regeneration.

For example, the stream of unfiltered material is conveyed through the columns 1 to 3 and leaves the same in a stabilized form when the valves 2, 18, 16, 14, 20, 22, 24, 4 are activated.

When approximately 80% of column 1 is used up, column 4 is included in the stabilization phase by switching of the valves 12 and 16. When column 1 is 100% used up, it is returned to regeneration by closing of the valves 18 and 20. When column 2 is approximately 80% used up, column 5 is included in the stabilization phase by switching of the valves 10 and 28; when column 2 is 100% used up, it is returned for regeneration by closing the valves 16 and 22.

In this manner, all of the columns are successively moved into the stabilization or regeneration phase.

For example, regeneration of column 1 begins when the valves 18 and 20 are closed. The unfiltered material that remains in the column is either pressed into a storage tank with inert gas or is displaced with water.

This is followed by a hot water, soda lye, hot water, acid, and cold water rinsing via a CIP when the valves 17 and 18 are activated.

The advantage of this multiple column process in contrast to the previously described process consists, among other things, in the simplified apparatus, because in comparison to the configuration of FIG. 1, dosing pumps and dosing vessels are eliminated, and by the switching over of the individual columns a rapid and economical filtration can be achieved.

Beyond the method described, it is also possible with the inventive agglomeration and filtering aids to carry out a combined stabilization and filtration of beverages, such as beer, juice, wine. For this purpose, the beverages can be produced with a combination of filtering aids of binary components that are produced pursuant to some of the aforementaioned methods with PVPP particles and in particular are stabilized and filtered, whereby filtering aids and PVPP particles are continuously fed to the stream of unfiltered material, so that a filter cake results that has outstanding stabilizing and filtering characteristics and that after conclusion of this combined filtration/stabilization in the filter can be regenerated and can then be used for a new combination filtration/stabilization.

The combination filtration/stabilization has the advantage that with a filter aid pursuant to the inventive method of manufacture, which simultaneously has filtering and stabilization characteristics, and with a structurally straightforward filter construction, it is possible in a single stage on the filtration side, for example, to separate out impurities while on the stabilization side, for example, to separate off tannin.

In summary, it is to be noted that with the present invention non-regeneratable fine material, such as PVPP, can be converted into environmentally compatible, i.e. non-polluting, inexpensive regeneratable filtering aids and/or stabilizing aids, in particular even of different starting materials. For example, it is also possible to produce an aluminum-free cake filter aid that is to be used where it is not desired to use aluminum as a cake filter aid. Aids produced pursuant to the present invention lead to considerable improvement of operation during cake filtration, especially during the stabilization of beverages to avoid turbidity. Extremely advantageous is the fact that specifically heavy particles and specifically lighter particles no longer separate or dissociate in the filter material, as was previously the case, for example, for components of aluminum and polyethylene. The uniform mixing density and homogeneity ensure use for practically all fields, but especially for use as regeneratable filter material and/or for cake filtration. Finally, by appropriate composition of the components, control of the process steps, especially the heating process, and the agglomerization, it is possible to produce filtering aids of prescribed size and permeability that when filled is characterized by favorable pressure conditions of the medium that is to be filtered or stabilized and by its great homogeneity.

The present invention is, of course, in no way restricted to the specific disclosure of the specification and drawings, but also encompasses any modifications within the scope of the appended claims.

What I claim is:

1. A method of manufacturing stabilizing and/or filtering aids that adsorb polyphenols, for use in the processing of beverage-type liquids, using a mixture of various materials, at least one of which is in the form of granular particles selected from the group consisting of fine to very fine particles, said method including the steps of:

compressing said mixture;

heating said compressed mixture to agglomerate said mixture by heating said mixture to near the melting point of a meltable material of said mixture to melt said meltable material;

fixing said agglomerated mixture via a sintering-type process;

subjecting said fixated agglomerate to a grinding processes or a screening process to provide a granular stabilizing and/or filtering aid, wherein a granule size is selected in conformity with an intended application.

2. A method according to claim 1, which, to produce granular beverage-stabilizing aids of a given size and stability, includes the step of using granular particles of synthetic origin or modified cellulose.

3. A method according to claim 2, wherein said synthetic organic particles have different granule fractions.

4. A method according to claim 2, which includes the steps of: subjecting said particles to a compacting process such that, in a screw press that is disposed upstream of a compacting apparatus, said particles are precompressed and heated for a duration of 10 to 120 minutes at temperatures in the vicinity of the melting point, 140° to 260° C.; and subsequently sintering said particles together to form said agglomerate in compacting rollers of said compacting apparatus at a specific sintering temperature of 160° to 170° C. for a suitable length of time of preferably 0.1 to 5 minutes.

5. A method according to claim 1, which includes mixing and homogenizing fine organic granular particles of synthetic origin with organic fibers of synthetic origin, selected from at least one of the group consisting of polypropylene (PP) and polyethylene (PE) synthesis pulp, high density polyethylene (HDPE), high density polypropylene (HDPP), halogenated polyethylenes, polyoxymethylene, and polyamides, and carrying out said mixing in such a way that very fine particles of said granular particles adhere to moist surfaces of said fibers; wherein wetting water is evaporated prior to sintering said fine particles together, and finally providing a desired particle size.

6. A method according to claim 1, which includes the step of using at least one of the materials selected from the group consisting of: organic particles of synthetic origin; and particles of natural origin, selected from at least one of the group consisting of cellulose and starch particles.

7. A method according to claim 1, which includes the step of using at least one of the materials selected from the group consisting of: organic particles of synthetic origin; inorganic particles selected from the group consisting of diatomires, perlites, highly calcined, alkali and acid resistant oxides further selected from the group consisting of α-aluminum oxide, zirconium dioxide, and titanium dioxide; carbon particles; and zeolites.

8. A method according to claim 1, which includes the step of using at least one of the material selected from the group consisting of: organic fibers of synthetic origin; and fibers of natural origin, selected from the group consisting of nearly alkali and acid resistant α-cellulose fibers, and those that have been bleached with chlorine or hydrogen peroxide and have been wet and/or dry conditioned, with said fibers having a fiber length of up to 5000 μm and a fiber thickness of from about 0.1 to 50 μm.

9. A method according to claim 1, which includes the step of using at least one of the materials selected from the group consisting of: organic fibers of synthetic origin; fibers of natural origin; inorganic fibers, selected from the group consisting of glass fibers, carbon fibers, aluminum oxide fibers, and metal fibers, in fiber lengths of up to 5000 μm and fiber thicknesses of from about 0.1 to 50 μm, and finely ground high-grade steel in the form of dust or particles, with a thickness of 0.1 to 0.5 μm.

10. A method according to claim 1, which includes the step of using hydrophilic thermoplastic fibrils having a water content of from 0 to 60%.

11. A method according to claim 10, which includes the step of using fine-fibrous thermoplastic fibrils.

12. A method according to claim 10, wherein said heating step includes slowly increasing the temperature of a mixture of fine-grained material and moist hydrophilic thermoplastic fibrils to evaporate the water fraction.

13. A method according to claim 10, wherein said thermoplastic fibrils have a fiber length of about 0.05 to 5 mm.

14. A method according to claim 1, which includes the steps of: keeping said mixture in motion during said heating step, and effecting said heating step in an inert atmosphere.

15. A method of manufacturing filtering and stabilizing aids for liquids, said method including the steps of:

intensely mixing together organic fibers of synthetic origin, selected from the group consisting of alkali and acid resistant synthetic fibers of PE, PP, HDPP, HDPE, halogenated polyethylene, polyoxymethylenes, and polyamides, with one of the group consisting of: fine organic granular particles of synthetic origin, and synthetic granulates selected from the group consisting of PE granulates and modified cellulose, to form a mixture;

supplying said mixture to a compacting machine;

maintaining an operating temperature near the melting point of a meltable material of said mixture to melt said meltable material to thereby form an agglomerate; and converting said agglomerate, by means of crushing and mixing apparatus, to desired grain size fractions.

16. A method according to claim 15, wherein fine-grained PVPP and PE fibers are sintered together in such a way that an agglomerate results having a grain size of from 30 to 200 μm.

17. A method of manufacturing stabilizing and/or filtering aids, for use in the processing of liquids, using particles selected from the group consisting of fine organic and inorganic granular particles, said method including the steps of:

for manufacturing filtering aids for alluvial and/or cake filtration, providing a mixture comprising: one of the materials selected from the group consisting of granular organic particles of natural or synthetic origin, inorganic particles selected from the group consisting of diatomites, perlites, highly calcined oxides ($\alpha$-$Al_2O_3$, zirconium dioxide) and carbon particles, and mixtures thereof; and at least one of the materials selected from the group consisting of organic fibers of cellulose and inorganic fibers, having a size up to about 5000 μm in length and a thickness of about 0.5 to 50 μm;

spraying said mixture, in a drying tower or a fluidized bed, with a binder selected from the group consisting of a melamine formaldehyde resin and an epichloorohydrin or epoxy resin;

condensing said binder out onto said mixture at a given temperature to form coated, agglomerated particles; and providing a desired grain size of said coated particles.

18. A method of using stabilizing and/or filtering aid manufactured according to the method of claim 17, said method including the step of using said aid as deposition medium for the filtration of pharmaceutical liquids, chemical liquids, or beverages.

19. A method of using the stabilizing and/or filtering aid manufactured according to the method of claim 17, said method including the step of using said aid for the cake and/or deep bed filtration of pharmaceutical-liquids, chemical liquids, or beverages for the separation of particles selected from the group consisting of particulate matter and colloidal particles.

20. A method of using a stabilizing aid manufactured according to the method of claim 1, said method including the step of using said aid to stabilize a beverage.

21. A method of using a stabilizing aid as in claim 20, sdaid method including the step of using said aid in a stabilizing and regenerating unit (STR).

22. A method of stabilizing beverages using stabilizing and/or filtering aids manufactured according to the method of claim 1, said method including the steps of:

adding said stabilizing and/or filtering aids to a stream of unfiltered material in a filter column to deposit said aids to form a filter cake;

regenerating said filter cake in column form;

discharging said regenerated filter cake in a dosing vessel and utilizing said filter cake for resuspension such that said stabilizing and/or filtering aids are redeposited in a column; and carrying out the aforementioned steps such that at least two filter columns are continuously operated in such a way that filtering and/or stabilizing takes place in one column while regeneration takes place in another, wherein said filter columns have a height of up to 1.5 m and a diameter of up to 1.5 m.

23. A method of stabilizing beverages using stabilizing and/or filtering aids manufactured according to the method of claim 1, said method including the steps of:

disposing said stabilizing and/or filtering aids in from four to one hundred filter columns;

conveying a specific quantity of unfiltered material through one of said columns until about 80% of the adsorption capacity thereof is used up;

thereupon introducing unfiltered material into another regenerating column until about 80% of the adsorption capacity thereof is also used up; and continuing the aforementioned steps until gradually all regenerated columns are operated while at the same time used-up columns are also continuously and successively regenerated, wherein said filter columns have a height of up to 1.5 m and a diameter of up to 1.5 m.

24. A method for the combined stabilization and filtration of beverages using stabilizing and/or filtering aids manufactured according to the method of claim 1, said method including the steps of:

continuously adding filtering aid and PVPP particles to a stream of unfiltered material to form a deposited filter cake; and after termination of a combination filtration/stabilization in a filter, regenerating said deposited filter cake in said filter and making said filter cake available for a new combination filtration/stabilization operation, wherein said filter columns have a height of 1.5 m and a diameter of up to 1.5 m.

25. A method of using column-type vessels in conjunction with filtering and/or stabilizing aids manufactured according to the method of claim 1, said method including the step of using said aid for the stabilization and/or filtration and/or regeneration of liquids.

26. A method according to claim 3, wherein said granule fractions are at least one fraction selected from the group consisting of between 0.1 μm to about 10 μm, between 10 μm to about 50 μm, and greater than 50 μm.

27. A method according to claim 15, wherein said fine organic granular particles of synthetic origin have different grain fractions, being selected from the group consisting of less than 1 μm to about 10 μm, greater than 10 μm to about 50 μm, and greater than 50 μm.

\* \* \* \* \*